US011981801B2

(12) United States Patent
Wang et al.

(10) Patent No.: US 11,981,801 B2
(45) Date of Patent: May 14, 2024

(54) POLYPROPYLENE COMPOSITION

(71) Applicant: BOREALIS AG, Vienna (AT)

(72) Inventors: Jingbo Wang, Linz (AT); Simon Schwarzenberger, Linz (AT); Klaus Bernreitner, Linz (AT); Markus Gahleitner, Linz (AT)

(73) Assignee: BOREALIS AG, Vienna (AT)

( * ) Notice: Subject to any disclaimer, the term of this patent is extended or adjusted under 35 U.S.C. 154(b) by 1089 days.

(21) Appl. No.: 16/622,569

(22) PCT Filed: Jul. 13, 2018

(86) PCT No.: PCT/EP2018/069093
§ 371 (c)(1),
(2) Date: Dec. 13, 2019

(87) PCT Pub. No.: WO2019/012110
PCT Pub. Date: Jan. 17, 2019

(65) Prior Publication Data
US 2023/0242748 A1  Aug. 3, 2023

(30) Foreign Application Priority Data
Jul. 14, 2017 (EP) .................... 17181345

(51) Int. Cl.
*C08L 23/14* (2006.01)
*C08J 5/18* (2006.01)

(52) U.S. Cl.
CPC .............. *C08L 23/142* (2013.01); *C08J 5/18* (2013.01); *C08J 2323/14* (2013.01); *C08J 2423/14* (2013.01); *C08L 2203/162* (2013.01); *C08L 2205/025* (2013.01)

(58) Field of Classification Search
CPC .............. C08J 2323/14; C08J 2423/14; C08L 2205/025; C08L 23/142
See application file for complete search history.

(56) References Cited

U.S. PATENT DOCUMENTS

| 2011/0065873 | A1* | 3/2011 | Grein .................... C08F 110/06 526/90 |
| 2013/0020393 | A1 | 8/2013 | Paavilainen et al. |

FOREIGN PATENT DOCUMENTS

| CN | 102046723 A | 5/2011 | |
| CN | 102131838 A | 7/2011 | |
| CN | 102858869 A | 1/2013 | |
| CN | 103154123 A | 6/2013 | |
| CN | 103930481 A | 7/2014 | |
| CN | 104854188 A | 8/2015 | |
| CN | 106167533 A | 11/2016 | |
| EP | 0887379 B1 | 12/1998 | |
| EP | 2610271 A1 | 7/2013 | |
| EP | 2610272 A1 | 7/2013 | |
| EP | 2610273 A1 | 7/2013 | |
| EP | 3064514 A1 | 9/2016 | |
| EP | 3064548 A1 | 9/2016 | |
| RU | 2334766 C2 | 9/2008 | |
| RU | 2567750 C2 | 11/2015 | |
| WO | 92/12182 A1 | 7/1992 | |
| WO | WO-9532235 A1 * | 11/1995 | ............. B29C 65/02 |
| WO | 99/24478 A1 | 5/1999 | |
| WO | 99/24479 A1 | 5/1999 | |
| WO | 00/68315 A1 | 11/2000 | |
| WO | 2002/02576 A1 | 1/2002 | |
| WO | 2003/000754 A1 | 1/2003 | |
| WO | 2003/000757 A1 | 1/2003 | |
| WO | 2004/000899 A1 | 12/2003 | |
| WO | 2004/029112 A1 | 4/2004 | |
| WO | 2004/111095 A1 | 12/2004 | |
| WO | 2007/116034 A1 | 10/2007 | |
| WO | 2007/137853 A1 | 12/2007 | |
| WO | 2010/052260 A1 | 5/2010 | |
| WO | 2010/052263 A1 | 5/2010 | |
| WO | 2010/052264 A1 | 5/2010 | |
| WO | 2011/076780 A1 | 6/2011 | |
| WO | 2011/135004 A2 | 11/2011 | |
| WO | 2012/001052 A2 | 1/2012 | |
| WO | 2012/007430 A1 | 1/2012 | |
| WO | 2012/051239 A1 | 4/2012 | |
| WO | 2012/084961 A1 | 6/2012 | |
| WO | 2015/158790 A2 | 10/2015 | |
| WO | 2016073868 A1 | 5/2016 | |
| WO | 2016139162 A1 | 9/2016 | |
| WO | 2016139163 A1 | 9/2016 | |
| WO | 2017097579 A1 | 6/2017 | |

OTHER PUBLICATIONS

Applicant: Borealis AG; "Polypropylene Composition"; Chinese Application No. 20188039003.2; Chinese Office Action dated Sep. 28, 2021; 12 pgs.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun., 2007, 28, 1128-1134.
Castignolles, et al., "Detection and quantification of branching in polyacrylates by size-exclusion chromatography (SEC) and melt-state 13C NMR spectroscopy", Polymer 50 (2009) 2373-2383.
H. N. Cheng, "13C NMR Analysis of Ethylene-Propylene Rubbers", Macromolecules 1984, 17, 1950-1955.
Filip et al., "Heteronuclear decoupling under fast MAS by a rotor-synchronized Hahn-echo pulse train", Journal of Magnetic Resonance 176 (2005) 239-243.

(Continued)

*Primary Examiner* — Kregg T Brooks
*Assistant Examiner* — David R. Foss
(74) *Attorney, Agent, or Firm* — TAROLLI, SUNDHEIM, COVELL & TUMMINO L.L.P.

(57) ABSTRACT

New polypropylene composition which combines low sealing initiation temperature (SIT), low overall migration, good optical properties, like low haze and good retortability, its use and articles made therefrom.

12 Claims, No Drawings

(56) References Cited

OTHER PUBLICATIONS

Griffin et al., "Low-load rotor-synchronised Hahn-echo pulse train (RS-HEPT) 1H decoupling in solid-state NMR: factors affecting MAS spin-echo dephasing times", Magn. Reson. Chem. 2007; 45: S198-S208.

Kakugo, et al., "13C NMR Determination of Monomer Sequence Distribution in Ethylene-Propylene Copolymers Prepared with -δ TiCl3-Al(C2H5)2Cl", Macromolecules 1982, 15, 1150-1152.

Klimke, et al., "Optimisation and Application of Polyolefin Branch Quantification by Melt-State 13C NMR Spectroscopy", Macromol. Chem. Phys. 2006, 207, 382-395.

Parkison, et al., "Effect of Branch Length on 13C NMR Relaxation Properties in Molten Poly[ethyleneco-(a-olefin)] Model Systems", Macromol. Chem. Phys. 2007, 208, 2128-2133.

Pollard, et al., "Observation of Chain Branching in Polyethylene in the Solid State and Melt via 13C NMR Spectroscopy and Melt NMR Relaxation Time Measurements", Macromolecules 2004, 37, 813-825.

Resconi, et al., "Selectivity in Propene Polymerization with Metallocene Catalysts", Chem. Rev. 2000, 100, 1253-1345.

Singh, et al., "Triad sequence determination of ethylene-propylene copolymers—application of quantitative 13C NMR", Polymer Testing 28 (2009) 475-479.

Patent Cooperation Treaty PCT Third Party Observation for International Application No. PCT/EP201/069093, dated Sep. 25, 2019.

Office action for Taiwan Patent Application No. 107124214, dated Jul. 25, 2019.

Wang, et al., "Structural Analysis of Ethylene/Propylene Copolymers Synthesized with a Constrained Geometry Catalyst", Macromolecules 2000, 33, 1157-1162.

Zhou, et al., "A new decoupling method for accurate quantification of polyethylene copolymer composition and triad sequence distribution with 13C NMR", Journal of Magnetic Resonance 187 (2007) 225-233.

Applicant: Borealis AG; "Polypropylene Composition"; European Application No. 18738340.1 (Patent No. EP3652247B1); Opposition according to A. 99 EPC; Jun. 1, 2022; 12 pgs.

Russian Search Report for application No. 2020101569/04 dated Jun. 4, 2020.

Russian Office Action for application No. 2020101569/04(002291) dated Jun. 4, 2020.

\* cited by examiner

POLYPROPYLENE COMPOSITION

The present invention is related to a new polypropylene composition which combines low sealing initiation temperature (SIT), low overall migration and good optical properties, like low haze and good retortability.

The present invention is furthermore related to the use of the polypropylene composition and articles made therefrom.

Polypropylenes are suitable for many applications. For instance polypropylene (PP) is applicable in areas where sealing properties play an important role, like in the food or medical packing industry.

Heat sealing is the predominant method of manufacturing flexible and semi-rigid packages. An important indication of good sealing performance is inter alia a low seal initiation temperature (SIT), which is needed to support high speed on packaging machines. To ensure fast sealing, a low SIT is of advantage. By operating at lower temperature there is the benefit that the article to be sealed is not exposed to high temperature. There are also economic advantages since lower temperatures are of course cheaper to generate and maintain.

There are further advantages by avoiding high sealing temperatures, especially when temperature sensitive goods are to be packed.

Furthermore, it is also desired to have a packaging material with satisfying optical properties, such as low haze.

In the field of some food applications such as retort pouches or some medical applications, a sterilization treatment is needed. The most common sterilization procedures are the use of heat (steam), radiation (beta radiation, electrons, or gamma radiation) or chemicals (usually ethylene oxide). Steam sterilization is usually carried out in a temperature range of about 120° C. to 130° C. Thus, the material should have a sufficient thermal stability, like a melting temperature significantly higher than the usual steam sterilization temperature of about 120° C. to 130° C.

Of course, treatment of a polymer under the sterilization conditions outlined above can impair its final properties, especially the optical properties such as transparency, i.e. low haze.

In addition certain regulations have to be fulfilled regarding the use of such materials in food contact applications, thus compliancy to food regulations in terms of overall migration (OM) is a must in advanced packaging applications.

Furthermore, a higher content of soluble resp. extractable components such as hexane solubles is also undesirable in the field of medical packaging.

Irrespectively from the polymer type, a polymer composition must fulfil at best all desired end properties and additionally must be easily processable, i.e. must withstand stress. However, end properties and processing properties act often in a conflicting manner.

It frequently turns out that improvement of one of the desired properties is achieved on the expense of the other properties. For example, in order to improve the sealing behaviour, normally low sealing initiation temperature (SIT) is obtained with higher comonomer content, however causing two problems:
1. High comonomer results in lower Tm, which potentially makes steam sterilization worse or even impossible and
2. Incorporation of a higher amount of comonomers, especially for PP based on Ziegler-Natta (ZN) type catalysts, causes problems with C6-solubles (FDA) and overall migration.

EP 3 064 548 suggest a polypropylene composition being a binary blend comprising a propylene-hexene copolymer fraction P1 and a propylene-hexene-ethylene copolymer fraction P2 in specific amounts to achieve the desired balance between high melting point and low sealing initiation temperature SIT, which additionally possess a broad sealing window, beneficial optical properties, low amounts of hexane solubles and sufficient thermal stability to enable sterilization treatment without negatively affecting the optical properties. This composition has a quite high amount of xylene cold soluble (XCS) fraction.

EP 3 064 514 suggests for the same purpose a C2C3 random copolymer composition comprising 3 polymer fractions (A), (B) and (C) with different ethylene-comonomer content. This composition again has a quite high amount of xylene cold soluble (XCS) fraction.

Although a lot of development work has been done in that field, there is still a need for further improvement and thus to design materials having an improved balance between low sealing initiation temperature SIT, beneficial optical properties, low overall migration and sufficient thermal stability to enable sterilization treatment without negatively affecting the optical properties.

The present invention is based on the finding that the above discussed needs for heat sealing applications can be achieved by a specific design of a polypropylene composition.

SUMMARY OF THE INVENTION

Thus the present invention is related to a polypropylene composition comprising a blend of
(A) 50.0 to 99.0 wt % of a propylene-ethylene random copolymer with an ethylene content in the range of from 0.1 to 12.0 wt %, an $MFR_2$ (230° C., 2.16 kg, ISO1133) in a range of from 0.5 to 60.0 g/10 min and a melting temperature Tm (DSC) is in the range of from 135° C. to 155° C. and
(B) 1.0 to 50.0 wt % of a propylene-hexene random copolymer with a hexene content in the range of from 0.1 to 12.0 wt % and an $MFR_2$ (230° C., 2.16 kg, ISO1133) in a range of from 0.5 to 60.0 g/10 min and a melting temperature Tm (DSC) is in the range of 120° C. to 140° C.,
whereby
(i) the melting temperature of the propylene-hexene random copolymer (B) is lower than the melting temperature of the propylene-ethylene random copolymer (A) and
(ii) the $MFR_2$ (230° C., 2.16 kg, ISO1133) of the blend is in a range of from 0.5 to 60.0 g/10 min.

It has surprisingly been found out that such compositions have an optimized or improved balance between low sealing initiation temperature SIT, beneficial optical properties, low overall migration and sufficient thermal stability to enable sterilization treatment, by which the optical properties are kept on a high level before and after sterilization.

In an embodiment of the present invention the propylene-ethylene random copolymer (A) is obtainable, preferably obtained, in the presence of a Ziegler-Natta catalyst and the propylene-hexene random copolymer (B) is obtainable, preferably obtained, in the presence of a metallocene catalyst.

In a further embodiment the invention is related to the use of the above defined composition for preparing articles and to the articles themselves.

DETAILED DESCRIPTION

In the following the individual components are defined in more detail.

The polypropylene composition of the present inventions comprises a blend of (A) a propylene-ethylene random copolymer and
(B) a propylene-hexene random copolymer Component (A) Propylene-Ethylene Random Copolymer The propylene-ethylene random copolymer has an ethylene content in the range of from 0.1 to 12.0 wt %, preferably in the range of from 0.5 to 10.0 wt %, more preferably in the range of from 1.0 to 8.0 wt %, yet more preferably in the range of from 1.5 to 7.0 wt % and even more preferably in the range of from 2.0 to 6.0 wt %.

The $MFR_2$ (230° C., 2.16 kg, ISO1133) of the propylene-ethylene random copolymer is in the range of from 0.5 to 60.0 g/10 min, preferably in the range of from 1.0 to 55.0 g/10 min, more preferably in the range of from 5.0 to 50.0 g/10 min, yet more preferably in the range of from 10.0 to 45.0 g/10 min and even more preferably in the range of from 20.0 to 40.0 g/10 min.

The melting temperature Tm of the propylene-ethylene random copolymer is in the range of from 135° C. to 155° C., preferably in the range of from 140° C. to 150° C.

In order to be suitable for food or pharmaceutical packaging applications it is furthermore desirable that the propylene-ethylene random copolymer has a limited amount of soluble and/or extractable substances.

It is therefore further preferred that the content of xylene cold solubles (XCS) of the propylene-ethylene random copolymer is from 2.0 to 13.0 wt %, more preferred from 4.0 to 12.0 wt % and even more preferably from 6.0 to 11.0 wt %.

The propylene-ethylene random copolymer can be produced in a single polymerization step comprising a single polymerization reactor (R1) or in a sequential polymerization process comprising at least two polymerization reactors (R1) and (R2), whereby in the first polymerization reactor (R1) a first propylene copolymer fraction (R-PP1) is produced, which is subsequently transferred into the second polymerization reactor (R2). In the second polymerization reactor (R2) a second propylene copolymer fraction (R-PP2) is then produced in the presence of the first propylene copolymer fraction (R-PP1).

Polymerization processes which are suitable for producing the propylene-ethylene random copolymer generally comprises one or two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene-ethylene random copolymer is produced in at least two reactors connected in series. Accordingly such a polymerization system comprises at least a first polymerization reactor (R1) and a second polymerization reactor (R2), and optionally a third polymerization reactor (R3).

The first, respectively the single, polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

In case a "sequential polymerization process" is applied the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

The propylene-ethylene random copolymer can be unimodal or multimodal, like bimodal, in view of comonomer content and/or $MFR_2$.

If the propylene-ethylene random copolymer is unimodal, it is preferably produced in a single polymerization step in one polymerization reactor (R1). Alternatively a unimodal propylene-ethylene random copolymer can be produced in a sequential polymerization process using the same polymerization conditions in all reactors.

If the propylene-ethylene random copolymer is multimodal, it is preferably produced in a sequential polymerization process using different polymerization conditions (amount of comonomer, hydrogen amount, etc.) in the reactors.

Preferably the propylene-ethylene random copolymer (A) according to this invention has been produced in the presence of a Ziegler-Natta catalyst.

The Ziegler-Natta catalyst is fed into the first, respectively the single, polymerization reactor (R1) and is optionally transferred with the polymer (slurry) obtained in the first polymerization reactor (R1) into the subsequent reactors, if the propylene-ethylene random copolymer is produced in a sequential polymerization process.

If the process covers also a pre-polymerization step it is preferred that all of the Ziegler-Natta catalyst is fed in the pre-polymerization reactor. Subsequently the pre-polymerization product containing the Ziegler-Natta catalyst is transferred into the first, respectively the single, polymerization reactor (R1).

This Ziegler-Natta catalyst can be any stereo-specific Ziegler-Natta catalyst for propylene polymerization, which preferably is capable of catalysing the polymerization and copolymerization of propylene and comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C) comprises a high-yield Ziegler-Natta type catalyst including an internal donor component, which can be used at high polymerization temperatures of 80° C. or more.

Such high-yield Ziegler-Natta catalyst (ZN-C) can comprise a succinate, a diether, a phthalate etc., or mixtures therefrom as internal donor (ID) and are for example commercially available for example from LyondellBasell under the Avant ZN trade name.

Further useful solid catalysts are also those disclosed in WO-A-2003/000757, WO-A-2003/000754, WO-A-2004/

029112 and WO 2007/137853. These catalysts are solid catalysts of spherical particles with compact structure and low surface area of the particles. Further, these catalysts are featured by a uniform distribution of catalytically active sites thorough the catalyst particles. Catalysts are prepared by emulsion-solidification method, where no external support is needed. The dispersed phase in the form of liquid droplets of the emulsion forms the catalyst part, which is transformed to solid catalyst particles during the solidification step.

Thus, in an embodiment of the present invention, the solid catalyst component is prepared by a process comprising:

preparing a solution of magnesium complex by reacting an alkoxy magnesium compound and an electron donor or a precursor thereof in a $C_6$-$C_{10}$ aromatic liquid reaction medium;

reacting said magnesium complex with a four valent titanium compound, preferably $TiCl_4$, at a temperature greater than 10° C. and less than 50° C. to produce an emulsion of a denser, dispersed phase having Ti/Mg mol ratio 0.1 to 10 and in a continuous phase having Ti/Mg mol ratio 10 to 100; and agitating the emulsion, optionally in the presence of an emulsion stabilizer and/or a turbulence minimizing agent, in order to maintain the droplets of said dispersed phase within an average size range of 5 to 200 μm.

The catalyst particles are obtained after solidifying said droplets of the dispersed phase by heating, preferably at a temperature from 80° C. to 110° C. In said process an aluminium alkyl compound of the formula $AlR_{3-n}X_n$, where R is an alkyl and/or an alkoxy group of 1 to 20, preferably of 1 to 10 carbon atoms, X is a halogen and n is 0, 1 or 2, is added and brought into contact with the droplets of the dispersed phase of the agitated emulsion. Alternatively, the aluminium alkyl compound of the formula $AlR_{3-n}X_n$, is brought into contact with the solidified particles at the washing step before recovering the final solid particles.

Suitable internal electron donors are, among others, (di) esters of aromatic (di)carboxylic acids. Said aromatic carboxylic acid ester or diester can be formed in situ by reaction of an aromatic carboxylic acid chloride or diacid chloride with a C2-C16 alkanol and/or diol, and is preferable di-2-ethyl-hexyl phthalate.

A further suitable catalyst for the present invention is a solid Ziegler-Natta catalyst, which comprises compounds of a transition metal of Group 4 to 6 of IUPAC, like titanium, a Group 2 metal compound, like a magnesium, and an internal donor being a non-phthalic compound, more preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is self-supported.

This Ziegler-Natta catalyst) can be further defined by the way as obtained.

Accordingly, the Ziegler-Natta catalyst is preferably obtained by a process comprising the steps of a)

a1) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or a2) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or a3) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or a4) providing a solution of Group 2 alkoxide of formula $M(OR^1)_n(OR^2)_m X_{2-n-m}$ or mixture of Group 2 alkoxides $M(OR^1)_n X_{2-n'}$ and $M(OR^2)_m X_{2-m'}$, where M is Group 2 metal, X is halogen, $R^1$ and $R^2$ are different alkyl groups with $C_2$ to $C_{16}$ carbon atoms, and 0<n<2, 0<m<2 and n+m+(2−n−m)=2, provided that both n and m≠0, 0<n'<2 and 0<m'<2; and b) adding said solution from step a) to at least one compound of a transition metal of Group 4 to 6 and c) obtaining the solid catalyst component particles, and adding a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c). In emulsion—solidification method in step b) the solution of step a) is typically added to the at least one transition metal compound at a lower temperature, such as from −10° C. to below 50° C., preferably from −5° C. to 30° C. During agitation of the emulsion the temperature is typically kept at −10 to below 40° C., preferably from −5° C. to 30° C. Droplets of the dispersed phase of the emulsion form the active catalyst composition. Solidification (step c) of the droplets is suitably carried out by heating the emulsion to a temperature of 70° C. to 150° C., preferably to 80° C. to 110° C.

The catalyst prepared by emulsion—solidification method is preferably used in the present invention.

In a preferred embodiment in step a) the solution of a2) or a3) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2- ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being a straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)m to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor that can be used in the preparation of the catalyst is preferably selected from (di) esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from alpha-olefin polymers of alpha-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP 261027 and EP2610272.

The Ziegler-Natta catalyst is optionally modified by the so called BNT-technology during a pre-polymerization step in order to introduce a polymeric nucleating agent.

Such a polymeric nucleating agent is preferably a vinyl polymer, such as a vinyl polymer derived from monomers of the formula

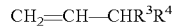

wherein $R^3$ and $R^4$, together with the carbon atom they are attached to, form an optionally substituted saturated or unsaturated or aromatic ring or a fused ring system, wherein the ring or fused ring moiety contains 4 to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^3$ and $R^4$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerization catalyst in the modification step of the polymerization catalyst preferably is 0.3 or more up to 40.0, such as 0.4 to 20.0 or more preferably 0.5 to 15.0, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1. In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10.0, preferably less than 3.0, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of about 0.1 wt % vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10° C. to 60° C., preferably 15° C. to 55° C.

General conditions for the modification of the catalyst are also disclosed in WO 00/6831, incorporated herein by reference with respect to the modification of the polymerization catalyst. The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula

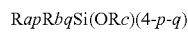

$$R_a^p R_b^q Si(OR^c)(4-p-q)$$

wherein Ra, Rb and Rc denote a hydrocarbon radical, in particular an alkyl or cycloalkyl group, and wherein p and q are numbers ranging from 0 to 3 with their sum p+q being equal to or less than 3. Ra, Rb and Rc can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula

$$Si(OCH_2CH_3)_3(NR^5R^6)$$

wherein $R^5$ and $R^6$ can be the same or different a represent a hydrocarbon group having 1 to 12 carbon atoms.

$R^5$ and $R^6$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^5$ and $R^6$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^5$ and $R^6$ are the same, yet more preferably both $R^5$ and $R^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor, a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [CofTC] must be in the range of above 80 to 500, preferably is in the range of 100 to 350, still more preferably is in the range of 120 to 300.

The propylene-ethylene random copolymer used according to this invention is thus preferably produced in the presence of (a) a Ziegler-Natta catalyst comprising an internal donor, (b) optionally a co-catalyst (Co), and (c) optionally an external donor (ED).

The propylene-ethylene random copolymer as defined in the instant invention may contain up to 5.0 wt % additives, like α-nucleating agents and antioxidants, as well as slip agents and antiblocking agents. Preferably the additive content (without α-nucleating agents) is below 3.0 wt %, like below 1.0 wt %.

Component (B) Propylene-Hexene Random Copolymer

The propylene-hexene random copolymer has an hexene content in the range of from 0.1 to 12.0 wt %, preferably in the range of from 0.5 to 11.0 wt %, more preferably in the range of from 1.0 to 10.0 wt %, yet more preferably in the range of from 1.5 to 9.0 wt %, even more preferably in the range of from 2.0 to 8.5 wt %, most preferably in the range of from 2.5 to 8.0 wt %, like from 3.0 to 7.0 wt %.

The $MFR_2$ (230° C., 2.16 kg, ISO1133) of the propylene-hexene random copolymer is in the range of from 0.5 to 60.0 g/10 min, preferably in the range of from 5.0 to 55.0 g/10 min, more preferably in the range of from 10.0 to 50.0 g/10 min, yet more preferably in the range of from 20.0 to 50.0 g/10 min and even more preferably in the range of from 25.0 to 45.0 g/10 min.

The melting temperature Tm of the propylene-hexene random copolymer is in the range of from 120° C. to 140° C., preferably in the range of from 120° C. to 135° C.

Preferably the propylene-hexene random copolymer has a molecular weight distribution (Mw/Mn) of at least 2.0, more preferably in the range of 2.0 to 4.5, still more preferably in the range of 2.0 to 3.5.

Additionally or alternatively to the molecular weight distribution (Mw/Mn) as defined in the previous paragraph the propylene-hexene random copolymer has preferably weight average molecular weight Mw in the range of 120 to 500 kg/mol, more preferably in the range of 130 to 400 kg/mol, like in the range of 135 to 300 kg/mol.

The propylene-hexene random copolymer as described above is obtainable, preferably obtained, in the presence of a metallocene catalyst.

The metallocene catalyst can be a supported catalyst, using conventional supports or can be free from an external carrier. By free from an external carrier is meant that the catalyst does not contain an external support, such as an inorganic support, for example, silica or alumina, or an organic polymeric support material Preferably used are metallocene catalysts which are free from an external carrier.

Preferably the metallocene catalyst comprises (i) a complex of formula (I):

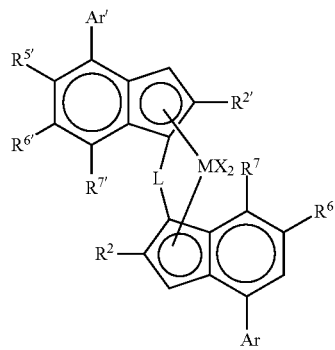

wherein
M is zirconium or hafnium;
each X is a sigma-donor ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16;
$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups R';
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a $C_{1-20}$ hydrocarbyl group;
and
(ii) a cocatalyst comprising a compound of a group 13 metal, e.g. Al or boron compound.

The catalyst preferably used to produce the propylene-hexene random copolymer used in the invention is in solid particulate form. As mentioned above it can be supported on a conventional carrier know to an art skilled person. Preferably the used catalyst is free from an external carrier.

Ideally, the catalyst is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

The term $C_{1-20}$ hydrocarbyl group includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Such catalysts are described for example in WO 2013/007650.

Preferred complexes for the preparation of the propylene-hexene random copolymer are of formula (II') or (II)

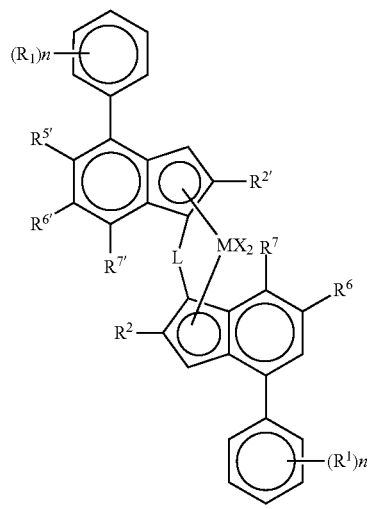

(II')

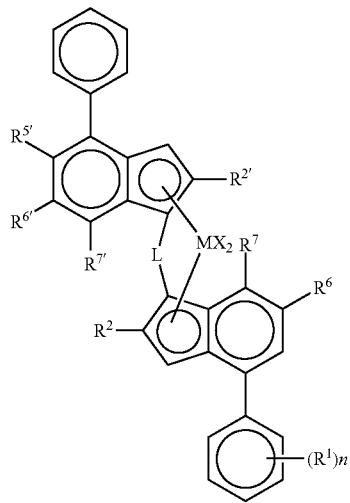

(II)

wherein

M is zirconium or hafnium;

each X is a sigma-donor ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^{5'}$ is a $C_{1-10}$ alkyl group or $Z'R^{3'}$ group;

$R^6$ is hydrogen or a $C_{1-10}$ alkyl group;

$R^{6'}$ is a $C_{1-10}$ alkyl group or $C_{6-10}$ aryl group;

$R^7$ is hydrogen, a $C_{1-6}$ alkyl group or $ZR^3$ group;

$R^{7'}$ is hydrogen or a $C_{1-10}$ alkyl group;

Z and Z' are independently O or S;

$R^{3'}$ is a $C_{1-10}$ alkyl group, or a $C_{6-10}$ aryl group optionally substituted by one or more halo groups;

$R^3$ is a $C_{1-10}$-alkyl group;

each n is independently 0 to 4, e.g. 0, 1 or 2;

and each R' is independently a $C_{1-20}$ hydrocarbyl group, e.g. $C_{1-10}$ alkyl group.

Further preferred complexes for the preparation of the propylene-hexene random copolymer are of formula (III') or (III) or (IIIb):

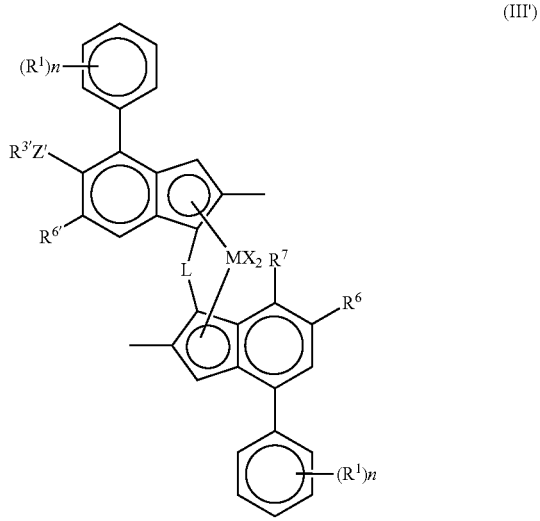

(III')

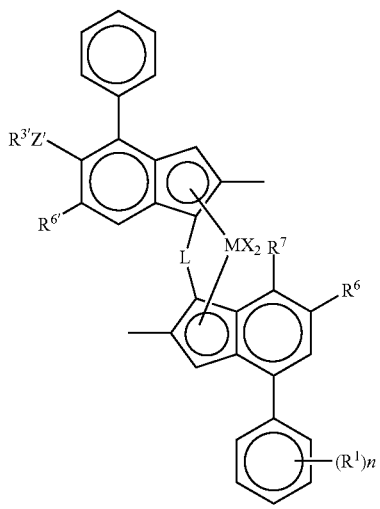

(III)

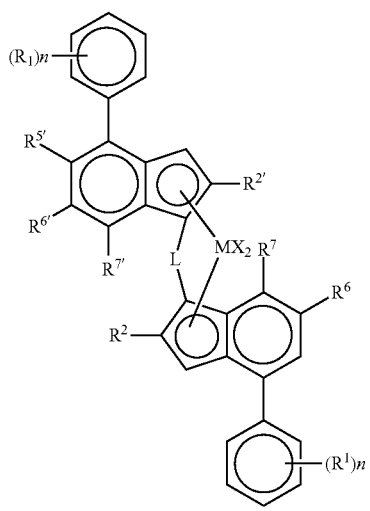

(IIIb)

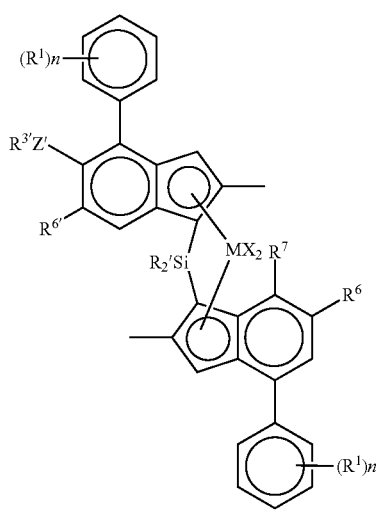

(IV')

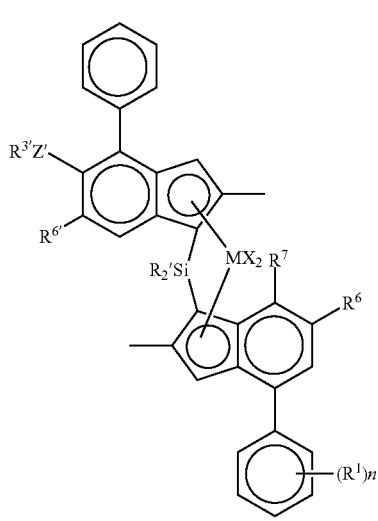

(IV)

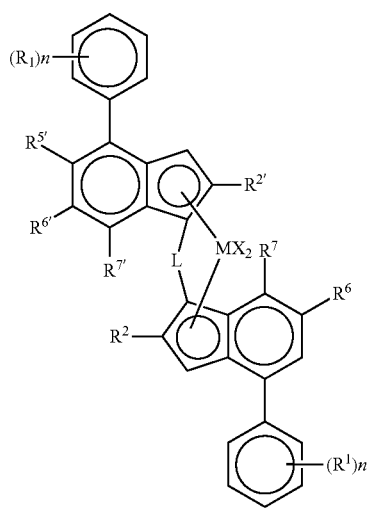

(IVb)

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$cycloalkyl;

$R^{5'}$ is a $C_{1-6}$ alkyl group $R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes for the preparation of the propylene-hexene random copolymer are of formula (IV') or (IV) or (IVb):

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^{5'}$ is a $C_{1-4}$ alkyl group $R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{1-8}$ alkyl group.

Most especially, the complex for the preparation of the propylene-hexene random copolymer is of formula (V') or (V) or (Vb):

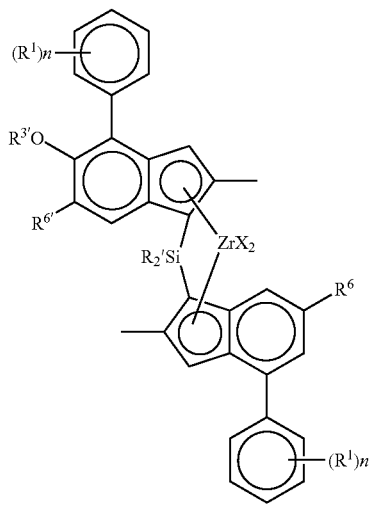

(V')

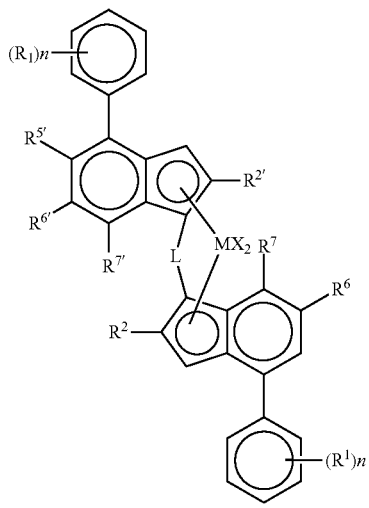

(IVb)

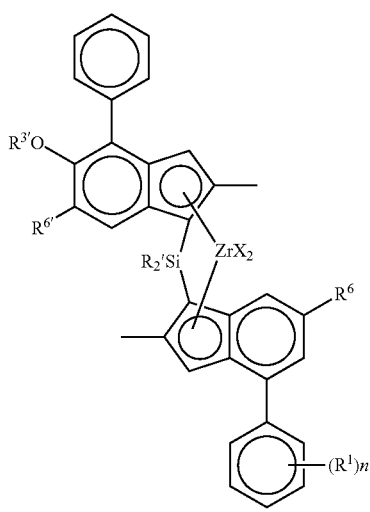

(V)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{1-8}$ alkyl;

$R^{5'}$ is a $C_{1-4}$ alkyl group $R^6$ is hydrogen or a $C_{1-8}$ alkyl group;

$R_{6'}$ is a $C_{1-8}$ alkyl group or $C_{6-10}$ aryl group;

$R^{3'}$ is a $C_{1-6}$ alkyl group, or $C_{6-10}$ aryl group optionally substituted by one or more halo groups; and n is independently 0, 1 or 2.

The synthesis of these materials is described for example in WO2013/007650.

The ligands required to form the complexes and hence catalysts of the invention can be synthesised by any process and the skilled organic chemist would be able to devise various synthetic protocols for the manufacture of the necessary ligand materials. For Example WO 2007/116034 discloses the necessary chemistry. Synthetic protocols can also generally be found in WO 2002/02576, WO 2011/135004, WO 2012/084961, WO 2012/001052, WO 2011/076780 and WO 2015/158790. The examples section also provides the skilled person with sufficient direction.

For example, the following general synthetic scheme can be used:

Scheme 1

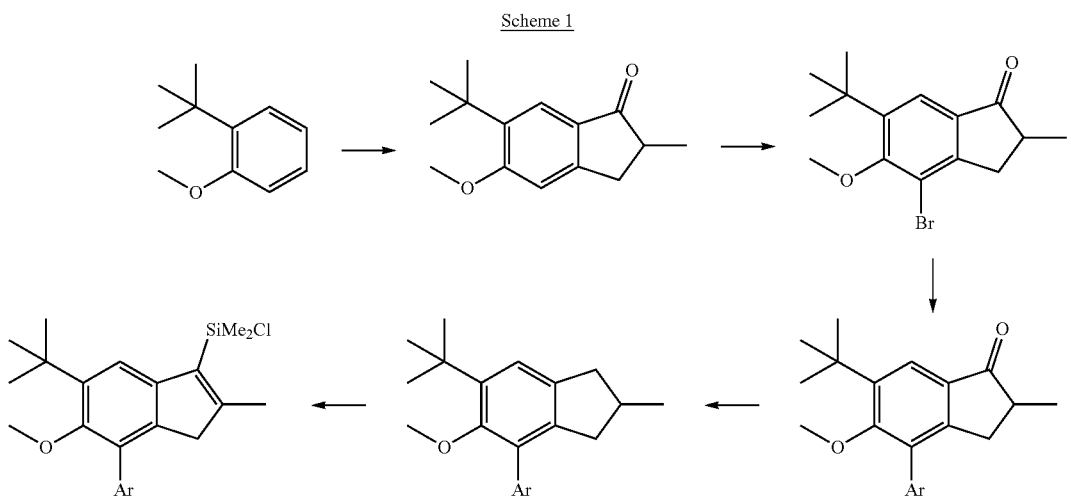

Suitable reagents for this transformation are given in the examples section.

Whilst this scheme refers to specific compounds, the general principles displayed here apply to all of the metallocenes described above. If the ligands are asymmetric, a conventional reaction with $SiMe_2Cl_2$ cannot be effected to bridge two ligands as that leads to symmetrical products. Instead, each ligand has to be attached to the bridge stepwise with control over the reaction stoichiometry.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts can also be employed. The use of $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4{}^{2-}$ is especially preferred. Suitable cocatalysts are described in WO2013/007650.

Suitable amounts of cocatalyst will be well known to the skilled man.

Manufacture

The catalyst used to manufacture the heterophasic copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerization

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

As monomers in the catalyst prepolymerization step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene.

The catalyst prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0° C. to 140° C., preferably 30° C. to 120° C., like 50° C. to 110° C.

Where the catalyst prepolymerization is done in fluorinated hydrocarbons, the temperature for the prepolymerization step is below 70° C., e.g. in the range of from −30° C. to 70° C., preferably from 0° C. to 65° C. and more preferably in the range of from 20° C. to 55° C.

Pressure within the prepolymerization vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerization vessel is preferably kept in an inert atmosphere, such as under nitrogen or argon or similar atmosphere.

Prepolymeriztaion is continued until the prepolymerization degree defined as weight of polymer matrix/weight of solid catalyst before prepolymerization step is reached. The degree is below 25, preferably 0.5 to 10.0, more preferably 1.0 to 8.0, most preferably 2.0 to 6.0.

Use of the catalyst prepolymerization step offers the advantage of minimising leaching of catalyst components and thus local overheating.

After prepolymerization, the catalyst can be isolated and stored.

The propylene-hexene random copolymer can be produced in a single polymerization step comprising a single polymerization reactor (R1) or in a sequential polymerization process comprising at least two polymerization reactors (R1) and (R2), whereby in the first polymerization reactor (R1) a first propylene copolymer fraction (R-PP1) is produced, which is subsequently transferred into the second polymerization reactor (R2). In the second polymerization reactor (R2) a second propylene copolymer fraction (R-PP2) is produced in the presence of the first propylene copolymer fraction (R-PP1).

Polymerization processes which are suitable for producing the propylene-hexene random copolymer generally comprises at one or two polymerization stages and each stage can be carried out in solution, slurry, fluidized bed, bulk or gas phase.

The term "polymerization reactor" is defined as described above for Component (A)

The term "sequential polymerization process" is defined as described above for Component (A).

The first, respectively the single, polymerization reactor ($R^1$) is preferably a slurry reactor and can be any continuous or simple stirred batch tank reactor or loop reactor operating in bulk or slurry. Bulk means a polymerization in a reaction medium that comprises of at least 60% (w/w) monomer.

According to the present invention the slurry reactor is preferably a (bulk) loop reactor.

In case a "sequential polymerization process" is applied the second polymerization reactor ($R^2$) and the optional third polymerization reactor ($R^3$) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315. A further suitable slurry-gas phase process is the Spheripol® process of Basell.

The propylene-hexene random copolymer can be unimodal or multimodal, like bimodal, in view of comonomer content and/or $MFR_2$.

If the propylene-hexene random copolymer is unimodal, it is preferably produced in a single polymerization step in one polymerization reactor (R1). Alternatively a unimodal propylene-hexene random copolymer can be produced in a sequential polymerization process using the same polymerization conditions in all reactors.

If the propylene-hexene random copolymer is multimodal, it is preferably produced in a sequential polymerization process using different polymerization conditions (amount of comonomer, hydrogen amount, etc.) in the reactors.

Preferably the propylene-hexene random copolymer used according to the present invention is unimodal.

The propylene-hexene random copolymer as defined in the instant invention may contain up to 5.0 wt % additives, like α-nucleating agents and antioxidants, as well as slip agents and antiblocking agents. Preferably the additive content (without α-nucleating agents) is below 3.0 wt %, like below 1.0 wt %.

Polypropylene Composition

The polypropylene composition according to this invention can be obtained by (melt)-mixing the individual fractions, i.e. propylene-ethylene random copolymer (A) and propylene-hexene random copolymer (B). During the melt mixing suitable additives can additionally be added. For mixing, a conventional compounding or blending apparatus, e.g. a Banbury mixer, a 2-roll rubber mill, Buss-co-kneader, a single screw extruder with special mixing segments or a twin screw extruder may be used. The polymer composition recovered from the extruder is usually in the form of pellets.

In the blend for the polypropylene composition according to this invention component (A) is present in an amount of from 50.0 to 99.0 wt % and component (B) is present in an amount of from 1.0 to 50.0 wt %.

Preferably component (A) is present in an amount of from 52.0 to 95.0 wt % and more preferably in an amount of from 54.0 to 90.0 wt %.

Thus component (B) is preferably present in an amount of from 5.0 to 48.0 wt % and more preferably in an amount of from 10.0 to 46.0 wt %.

For preparing the composition it is essential that a component (B) is used, which has a melting temperature Tm lower than the melting temperature Tm of component (A)

The overall melt flow rate, i.e. the melt flow rate $MFR_2$ (230° C.) measured according to ISO 1133 of polypropylene composition is in a range of from 0.5 to 60.0 g/10 min, preferably in a range of from 0.5 g/10 min to 50.0 g/10 min, more preferably in a range of from 1.0 g/10 min to 40.0 g/10 min and even more preferably in a range of from 1.0 to 30.0 g/10 min.

It is appreciated that the inventive polypropylene composition has a melting temperature in the range of from 128°

C. to 150° C., preferably in the range of from 130° C. to 148° C., and more preferably in the range of from 132° C. to 145° C.

Additionally it is appreciated that the inventive polypropylene composition has a crystallization temperature in the range of from 85° C. to 115° C., preferably in the range of from 90° C. to 110° C. and more preferably in the range of from 95° C. to 105° C.

Furthermore the inventive polypropylene composition is characterized by a low level of overall migration. Thus the inventive polypropylene composition has a level of overall migration determined according to EN ISO 1186-14:2002 on injection moulded plaques, 60×60×1 mm$^3$ of less than 20.0 mg/dm$^2$, preferably of less than 17.0 mg/dm$^2$, more preferably less than 14.0 mg/dm$^2$ and even more preferably less than 12.0 mg/dm$^2$.

The xylene cold soluble (XCS) fraction of the instant polypropylene composition is in the range of from 2.0 to 20.0 wt % (determined at 25° C. according ISO 16152; first edition; 2005), preferably in the range of from 3.0 to 20.0 wt % and more preferably in the range from 4.0 to 10.0 wt %.

The polypropylene composition as defined in the instant invention may contain up to 5.0 wt % additives, like α-nucleating agents and antioxidants, as well as slip agents and antiblocking agents. Preferably the additive content (without α-nucleating agents) is below 3.0 wt %, like below 1.0 wt %.

The present invention is further directed to a process for the preparation of the polypropylene composition as define above, the process comprising the steps of
(i) preparing component (A) by polymerizing propylene and ethylene in the presence of a Ziegler-Natta catalyst
(ii) preparing component (B) by polymerizing propylene and hexene in the presence of a metallocene catalyst
(iii) mixing said propylene-ethylene random copolymer (A) with the propylene-hexene random copolymer (B) to obtain a mixture of (A) and (B) and
(iv) extruding said mixture to obtain the blend of (A) and (B).

Applications

The present invention is not only directed to the instant polypropylene composition but also the use of the polypropylene composition for preparing articles and the articles comprising the polypropylene composition.

Suitable articles are films for flexible packaging systems, such as bags or pouches for food and pharmaceutical packaging or medical articles in general.

In an embodiment the present invention is related also to unoriented films and film layers of multi-layer film constructions comprising the inventive polypropylene composition. Accordingly the present invention is also directed to unoriented films, like cast films or blown films, e.g. air cooled blown films, comprising at least 90 wt %, preferably comprising at least 95 wt %, yet more preferably comprising at least 99 wt %, of the instant polypropylene composition.

It has been found that such polypropylene composition according to the present invention provides the film material made thereof with a combination of low sealing initiation temperature (S.I.T), beneficial optical properties, low amounts of hexane solubles and sufficient thermal stability to enable sterilization treatment, by which the optical properties are kept on a high level before and after sterilization.

Thus films, respectively articles according to the present invention comprising the above defined polypropylene composition are suitable for being sterilized without negatively affecting the optical properties.

Therefore the present invention is also directed to a sterilizable or sterilized article, preferably to a sterilizable or sterilized film, like a sterilizable or sterilized film. More preferably the invention is directed to containers, i.e. pouches, especially to steam sterilizable or steam sterilized containers, i.e. pouches, preferably comprising, more preferably consisting of, the film as defined herein. The container is in particular a pouch. Further said container, i.e. pouch, has been preferably subjected to a steam sterilization treatment in a temperature range of about 120° C. to 130° C.

Further, the invention is also directed to a multi-layer film construction, comprising an unoriented film as defined above as an outermost layer.

For being able to serve as a sealing layer in a multi-layer film construction, such an unoriented film comprising the inventive polypropylene composition shall preferably have a sealing initiation temperature (SIT) in the range of from 90° C. to 125° C., more preferably in the range of from 95° C. to less than 122° C., like in the range of from 100° C. to less than 121° C.

Furthermore such an unoriented film comprising the inventive polypropylene composition shall preferably have a haze determined on 50 μm cast film of below 80.0%, preferably of below 70.0% and more preferably of below 66.0%.

Clarity determined on 50 μm cast film comprising the inventive polypropylene composition shall preferably be above 90.0%

The films according to the invention furthermore have
  a haze value (determined on 50 μm cast film) after sterilization at 121° C. for 30 min of below 80.0%, preferably of below 70.0% and more preferably of below 66.0% and
  a clarity (determined 50 μm cast film) after sterilization at 121° C. for 30 min of at least 85.0%.

A multi-layer film construction comprising at least one layer comprising the inventive polypropylene composition is preferably produced by multi-layer co-extrusion followed by film casting or film blowing. In this case, at least one of the outermost layers of said multi-layer film construction serving as sealing layer(s) shall comprise the inventive polypropylene composition as defined above. The inventive multilayer film construction shall preferably have a thickness in the range of 30 to 500 μm, more preferably in the range of 50 to 400 μm, like in the range of 60 to 300 μm. The sealing layer(s) comprising the inventive polypropylene composition shall preferably have a thickness in the range of 3 to 50 μm, more preferably in the range of 5 to 30 μm, like in the range of 8 to 25 μm.

Films and/or multi-layer film constructions according to the present invention shall preferably be used for flexible packaging systems, such as bags or pouches for food and pharmaceutical packaging or medical articles in general.

In case a film is produced by cast film technology the molten polypropylene composition is extruded through a slot extrusion die onto a chill roll to cool the polypropylene composition to a solid film. Typically the polypropylene composition is firstly compressed and liquefied in an extruder, it being possible for any additives to be already added to the polypropylene composition or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10° C. to 50° C., preferably from 15° C. to 40° C.

In the blown film process the polypropylene composition melt is extruded through an annular die and blown into a tubular film by forming a bubble which is collapsed between nip rollers after solidification. The blown extrusion can be preferably effected at a temperature in the range 160° C. to 240° C., and cooled by water or preferably by blowing gas (generally air) at a temperature of 10° C. to 50° C. to provide a frost line height of 0.5 to 8 times the diameter of the die. The blow up ratio should generally be in the range of from 1.5 to 4, such as from 2 to 4, preferably 2.5 to 3.5.

Methods

The xylene soluble fraction at room temperature (XCS, wt %): The amount of the polymer soluble in xylene is determined at 25° C. according to ISO 16152; 2005, 5th edition; $MFR_2$ (230° C.) is measured according to ISO 1133 (230° C., 2.16 kg load) The melt flow rate is measured as the $MFR_2$ in accordance with ISO 1133 15 (230° C., 2.16 kg load) for polypropylene. The MFR is an indication of the flowability, and hence the processability, of the polymer. The higher the melt flow rate, the lower the viscosity of the polymer.

Comonomer Determination by NMR Spectroscopy (C2 Determination)

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance 111 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Comonomer Determination: Hexene Content—$^{13}C$ NMR Spectroscopy

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207:

382., Pollard, M., Klimke, K., Graf, R., Spiess, H. W., Wilhelm, M., Sperber, O., Piel, C., Kaminsky, W., Macromolecules 2004; 37:813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H = I\alpha B4/2$$

The amount of 1-hexene incorporated in PHHP double consecutive sequences was quantified using the integral of the ααB4 site at 41.7 ppm accounting for the number of reporting sites per comonomer:

$$HH = 2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H = (I\alpha B4 - 2*I\alpha\alpha B4)/2$$

The total 1-hexene content was calculated based on the sum of isolated and consecutively incorporated 1-hexene:

$$Htotal = H + HH$$

When no sites indicative of consecutive incorporation observed the total 1-hexen comonomer content was calculated solely on this quantity:

$$Htotal = H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21 = I\alpha\alpha 21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_s\alpha\alpha + 2*P21 + H + HH/2$$

The total amount of propene was quantified as the sum of primary (1,2) and secondary (2,1-erythro) inserted propene:

$$Ptotal = P12 + P21 = I_s\alpha\alpha + 3*I\alpha\alpha 21e9 + (I\alpha B4 - 2*I\alpha\alpha B4)/2 + I\alpha\alpha B4$$

This simplifies to:

$$Ptotal = I_s\alpha\alpha + 3*I\alpha\alpha 21e9 + 0.5*I\alpha B4$$

The total mole fraction of 1-hexene in the polymer was then calculated as:

$$fH = Htotal/(Htotal + Ptotal)$$

The full integral equation for the mole fraction of 1-hexene in the polymer was:

$$fH = (((I\alpha B4 - 2*I\alpha\alpha B4)/2) + (2*I\alpha\alpha B4))/((I_s\alpha\alpha + 3*I\alpha\alpha 21e9 + 0.5*I\alpha B4) + ((I\alpha B4 - 2*I\alpha\alpha B4)/2) + (2*I\alpha\alpha B4))$$

This simplifies to:

$$fH = (I\alpha B4/2 + I\alpha\alpha B4)/(I_s\alpha\alpha + 3*I\alpha\alpha 21e9 + I\alpha B4 + I\alpha\alpha B4)$$

The total comonomer incorporation of 1-hexene in mole percent was calculated from the mole fraction in the usual manner:

$$H[mol\ \%] = 100*fH$$

The total comonomer incorporation of 1-hexene in weight percent was calculated from the mole fraction in the standard manner:

$$H[wt\ \%] = 100*(fH*84.16)/((fH*84.16) + ((1-fH)*42.08))$$

DSC Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

Overall Migration

Overall Migration is determined according to EN ISO 1186-14:2002 on injection moulded plaques, 60×60×1 mm$^3$.

Number Average Molecular Weight (Mn), Weight Average Molecular Weight (Mw) and Polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003.

A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 μL of 1 sample solution were injected per analysis. The column set was calibrated using relative calibration with 19 narrow MWD polystyrene (PS) standards in the range of 0.5 kg/mol to 11 500 kg/mol and a set of well characterized broad polypropylene standards.

All samples were prepared by dissolving 5-10 mg of polymer in 10 mL (at 160° C.) of stabilized TCB (same as mobile phase) and keeping for 3 hours with continuous shaking prior sampling in into the GPC instrument.

Haze and clarity were determined according to ASTM D1003-00 on 60×60×1 mm$^3$ plaques injection molded in line with EN ISO 1873-2 using a melt temperature of 200° C.

and on cast films of 50 μm thickness produced on a monolayer cast film line with a melt temperature of 220° C. and a chill roll temperature of 20° C.

Sealing initiation temperature (SIT); sealing end temperature (SET), sealing range:

Differential Scanning Calorimetry (DSC) experiments were run on a TA Instruments Q2000 device calibrated with Indium, Zinc, and Tin according to ISO 11357/1. The measurements were run under nitrogen atmosphere (50 mL min-1) on 5±0.5 mg samples in a heat/cool/heat cycle with a scan rate of 10° C./min between −30° C. and 225° C. according to ISO 11357/3. Melting (Tm) and crystallisation (Tc) temperatures were taken as the peaks of the endotherms and exotherms in the cooling cycle and the second heating cycle respectively.

The Sealing Initiation Temperature (SIT) was predicted by analyzing the second heating scan according to the following procedure: the first limit for integration was set at 16° C., the second limit at Tm+20° C., and the total melting enthalpy was registered. The temperature T1 is defined as the temperature at which 19% of this melting enthalpy with the abovementioned limits for integration was obtained. The parameter SIT is finally calculated as:

SIT=1.0596×T1+3.8501

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

2. EXAMPLES

Component (A)

As component (A) a propylene-ethylene random copolymer was produced in a Borstar® pilot plant with a prepolymerization reactor and one slurry loop reactor.

The catalyst used was Avant ZN180M, provided by Basell. Cocatalyst was TEAL and the external donor was Donor D

TABLE 1

| Component (A) | | |
| --- | --- | --- |
| Prepolymerization | unit | |
| TEAL amount | [g/tC$_3$] | 170 |
| Donor type | | D |
| Donor amount | [g/tC$_3$] | 40 |
| Temperature | [° C.] | 20 |
| Residence time | [min] | 20 |
| Loop | | |
| Temperature | [° C.] | 70 |
| Pressure | [bar] | 55 |
| H2/C2 | [mol/kmol] | 3.1 |
| C2/C3 | [mol/kmol] | 8 |
| Polymer | | |
| MFR$_2$ | [g/10 min] | 30 |
| XCS | [wt %] | 9.0 |
| C2 content (NMR) | [wt %] | 3.7 |
| Tm | [° C.] | 145 |

Component B
Catalyst: Synthesis of Metallocene MC-1

2-Chloro-4-methylbenzaldehyde

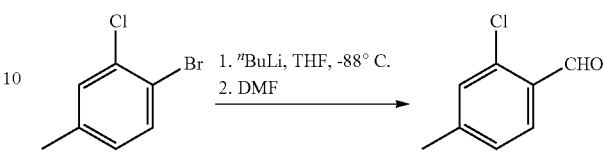

165 ml (413 mmol) of 2.5 M "BuLi in hexanes was added dropwise over 1 h to a solution of 82.2 g (400 mmol) of 3-chloro-4-bromo-toluene in 400 ml of THF cooled to −88° C. The resulting mixture was stirred for 30 min at this temperature, and then 44.0 g (602 mmol) of DMF was added dropwise over 10 min by vigorous stirring. The reaction mixture was stirred overnight at room temperature, then cooled to 0° C. in an ice bath and then 100 ml of water and 400 ml of 3N HCl were added. The organic layer was separated and the aqueous layer was extracted with 2×125 ml of dichloromethane. The combined organic extract was dried over K$_2$CO$_3$ and then passed through a short layer of silica gel 60 (40-63 μm). The silica gel layer was additionally washed with 50 ml of dichloromethane. The combined organic elute was evaporated to dryness to give a slightly orange liquid which was then distilled in vacuum to give 58.0 g (94%) of the title product (b.p. 99-102° C./11 mm Hg) as a colorless liquid that crystallized overnight at room temperature.

Anal. calc. for C$_8$H$_7$ClO: C, 62.15; H, 4.56. Found: C, 62.24; H, 4.45.

$^1$H NMR (CDCl$_3$): δ 10.4 (s, 1H, CHO), 7.80 (d, J=7.8 Hz, 1H, 6-H), 7.25 (s, 1H, 3-H), 7.17 (d, J=7.8 Hz, 1H, 5-H), 2.40 (s, 3H, 4-Me).

(2-Chloro-4-methylphenyl)methanol

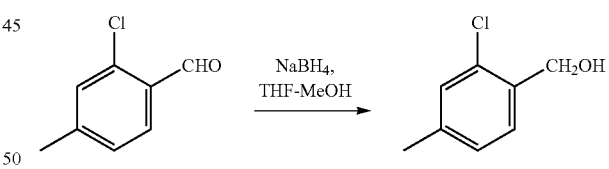

375 ml of methanol was added dropwise by vigorous stirring over 5 h to a mixture of 116 g (0.75 mol) of 2-chloro-4-methylbenzaldehyde and 43.0 g (1.14 mol) of NaBH$_4$ in 750 ml of THF at 0-5° C. This mixture was stirred overnight at room temperature, and then evaporated to dryness. The resulting oily mass was acidified with 1200 ml of 2 M HCl to pH~1, and the formed product was extracted consequently with 3×400 ml of dichloromethane. The combined organic extract was dried over Na$_2$SO$_4$ and evaporated to dryness. This product was used without additional purification.

$^1$H NMR (CDCl$_3$): δ 7.29 (d, J=7.8 Hz, 1H, 5-H), 7.15 (s, 1H, 3-H), 7.04 (d, J=7.8 Hz, 1H, 6-H), 4.67 (s, 2H, CH$_2$OH), 2.59 (br.s, 1H, CH$_2$OH), 2.30 (s, 3H, 4-Me). $^{13}$C{$^1$H} NMR (CDCl$_3$): δ 138.9, 135.0, 132.4, 129.7, 128.6, 127.6, 62.5, 20.7.

2-Chloro-1-(chloromethyl)-4-methylbenzene

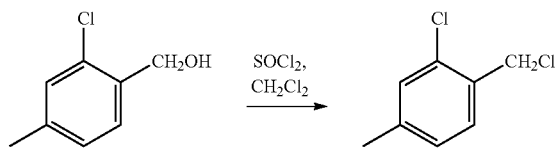

The above-obtained 2-chloro-4-methylbenzyl alcohol dissolved in 750 ml of dichloromethane was added dropwise to 55 ml (754 mmol) of thionyl chloride at +5° C. The resulting solution was stirred overnight at room temperature and then evaporated to dryness. The residue was dissolved in 500 ml dichloromethane, and the formed solution was washed by 250 ml of water. The organic layer was separated; the aqueous layer was extracted with 2×150 ml of dichloromethane. The combined organic extract was dried over $Na_2SO_4$, passed through a short pad of silica gel 60 (40-63 µm) and then evaporated to dryness. The crude product was distilled in vacuum to give 114 g (87%) of the title product as a colorless liquid, b.p. 92-95° C./5 mm Hg.

Anal. calc. for $C_8H_7Cl_2$: C, 54.89; H, 4.61. Found: C, 54.80; H, 4.65.

$^1$H NMR (CDCl$_3$): δ 7.30 (d, J=7.8 Hz, 1H, 5-H), 7.19 (s, 1H, 3-H), 7.04 (d, J=7.8 Hz, 1H, 6-H), 4.64 (s, 2H, CH$_2$Cl), 2.30 (s, 3H, Me). $^{13}$C{$^1$H} NMR (CDCl$_3$): δ 140.3, 133.7, 131.9, 130.6, 130.2, 127.9, 43.5, 20.8.

3-(2-Chloro-4-methylphenyl)-2-methylpropanoyl chloride

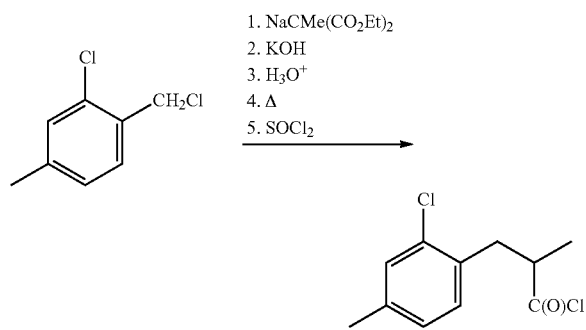

119 g (0.68 mol) of diethyl methylmalonate was added to a solution of sodium ethoxide obtained from 17.0 g (0.74 mol) of sodium metal and 600 ml of dry ethanol. The formed mixture was stirred for 15 min, and then 114 g (0.651 mol) of 2-chloro-1-(chloromethyl)-4-methylbenzene was added by vigorous stirring at such a rate to maintain a gentle reflux. The resulting mixture was refluxed for 2 h and then cooled to room temperature. A solution of 135 g of KOH in 550 ml of water was added. This mixture was refluxed for 4 h to saponificate the ester formed. Ethanol and water were distilled off until vapor temperature reached 95° C., then 3000 ml of water and then 12 M HCl (to pH~1) were added to the residue. The precipitated substituted methylmalonic acid was filtered off and washed with water. This diacid was decarboxylated at 160-180° C. to form a slightly orange oil that crystallized at room temperature. A mixture of the formed acid and 166 ml of thionyl chloride was stirred for 24 h at room temperature. After evaporation of the excess of thionyl chloride, the residue was distilled in vacuum to give 123 g (82%) of the title product, b.p. 105-117° C./5 mm Hg.

Anal. calc. for $C_{11}H_{12}Cl_2O$: C, 57.16; H, 5.23. Found: C, 57.36; H, 5.38.

$^1$H NMR (CDCl$_3$): δ 7.19 (s, 1H, 3-H), 7.10 (d, J=7.7 Hz, 1H, 5-H), 7.00 (d, J=7.7 Hz, 1H, 6-H), 3.20-3.32 (m, 2H, CHH' and CHMe), 2.82 (dd, J=12.8 Hz, J=6.4 Hz, 1H, CHH'), 2.30 (s, 3H, 4-Me), 1.30 (d, J=6.8 Hz, 3H, CHMe). $^{13}$C{$^1$H} NMR (CDCl$_3$): δ 177.1, 138.6, 133.8, 132.1, 131.2, 130.2, 127.7, 51.4, 36.5, 20.7, 16.7.

4-Chloro-2,6-dimethylindan-1-one

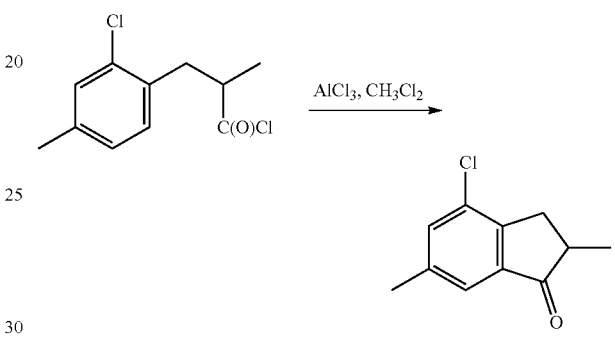

A solution of 123 g (531 mmol) of 3-(2-chloro-4-methylphenyl)-2-methylpropanoyl chloride in 100 ml of dichloromethane was added dropwise to a stirred suspension of 85.0 g (638 mmol) of AlCl$_3$ in 500 ml of dichloromethane at 5° C. This mixture was stirred overnight at room temperature and then poured onto 500 g of crushed ice. The organic layer was separated, and the aqueous layer was extracted with 3×100 ml of dichloromethane. The combined organic extract was washed by aqueous $K_2CO_3$, dried over $K_2CO_3$, passed through a short pad of silica gel 60 (40-63 µm), and then evaporated to dryness. Crude product was distilled in vacuum to give 98.4 g (95%) of a colorless liquid, b.p. 131-132° C./8 mm Hg.

Anal. calc. for $C_{11}H_{11}ClO$: C, 67.87; H, 5.70. Found: C, 68.01; H, 5.69.

$^1$H NMR (CDCl$_3$): δ 7.42 (s, 1H, 7-H), 7.38 (s, 1H, 5-H), 3.32 (dd, J=17.3 Hz, J=7.8 Hz, 1H, 3-CHH'), 2.68-2.76 (m, 1H, 2-H), 2.62 (dd, 1H, J=17.3 Hz, J=3.6 Hz, 3-CHH'), 2.38 (s, 3H, 6-Me), 1.31 (d, J=7.5 Hz, 3H, 2-Me). $^{13}$C{$^1$H} NMR (CDCl$_3$): δ 208.2, 148.0, 139.3, 138.1, 135.0, 132.1, 122.2, 42.0, 33.3, 20.7, 16.1.

4-Chloro-1-methoxy-2,6-dimethylindane

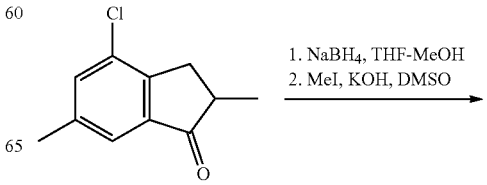

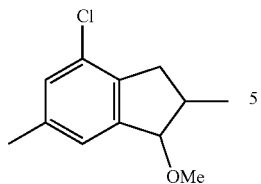

205 ml of methanol was added dropwise by vigorous stirring over 5 h to a mixture of 98.4 g (0.505 mol) of 4-chloro-2,6-dimethylindan-1-one and 29.0 g (0.767 mol) of NaBH$_4$ in 510 ml of THF at 0-5° C. This mixture was stirred overnight at room temperature and then evaporated to dryness. The residue was acidified by 2 M HCl to pH 5-6, and the formed 4-chloro-2,6-dimethylindan-1-ol was extracted with 3×300 ml of dichloromethane. The combined organic extract was dried over Na$_2$SO$_4$ and evaporated to dryness, yielding a white solid. 132 g (2.35 mol) of KOH and 163 g (1.15 mol) of MeI were added to a solution of the so obtained white solid in 800 ml of DMSO. This mixture was stirred for 5 h at ambient temperature. The solution was decanted from the excess of KOH, and the latter was additionally washed with 3×350 ml of dichloromethane. The combined organic extract was washed with 3000 ml of water. The organic layer was separated, and the aqueous layer was extracted with 3×300 ml of dichloromethane. The combined organic extract was washed with 7×1500 ml of water, dried over Na$_2$SO$_4$, and then evaporated to dryness. The residue was distilled in vacuum to give 99.9 g (94%) of the title product consisting of two pairs of enantiomers, b.p. 104-105° C./8 mm Hg.

Anal. calc. for C$_{12}$H$_{15}$ClO: C, 68.40; H, 7.18. Found: C, 68.58; H, 7.25.

Syn-isomers. $^1$H NMR (CDCl$_3$): δ 7.05 (s, 2H, 5-H and 7-H), 4.51 (d, J=5.7 Hz, 1H, 1-H), 3.41 (s, 3H, OMe), 2.92 (dd, J=15.3 Hz, J=6.4 Hz, 1H, 3-CHH'), 2.68-2.59 (m, 2H, 3-CHH' and 2-H), 2.32 (s, 3H, 6-Me), 1.07 (d, J=6.8 Hz, 3H, 2-Me). $^{13}$C{$^1$H} NMR (CDCl$_3$): δ 144.6, 138.3, 137.8, 130.7, 128.7, 124.1, 86.4, 57.0, 38.2, 36.9, 21.0, 13.5.

Anti-isomers. $^1$H NMR (CDCl$_3$): δ 7.05 (s, 1H, 7-H), 7.07 (s, 1H, 5-H), 4.37 (d, J=3.9 Hz, 1H, 1-H), 3.45 (s, 3H, OMe), 3.19 (dd, J=16.2 Hz, J=7.6 Hz, 1H, 3-CHH'), 2.50 (m, 1H, 2-H), 2.42 (dd, J=16.2 Hz, J=5.0 Hz, 1H, 3-CHH'), 2.32 (s, 3H, 6-Me), 1.16 (d, J=6.8 Hz, 3H, 2-Me). $^{13}$C{$^1$H} NMR (CDCl$_3$): δ 144.2, 138.1 (two resonances), 130.7, 128.9, 124.2, 91.8, 56.6, 39.4, 37.2, 21.0, 19.3.

4-(3,5-Dimethylphenyl)-1-methoxy-2,6-dimethylindane

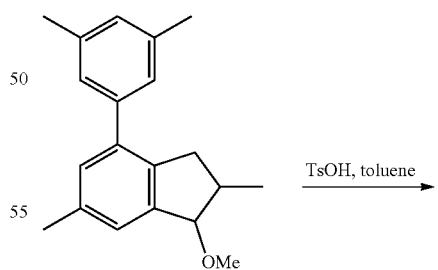

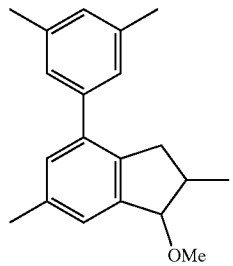

200 ml (200 mmol) of 1.0 M 3,5-di-methylphenylmagnesium bromide in THF was added at room temperature to a mixture of 2.10 g (2.69 mmol, 2.0 mol. %) of NiCl$_2$(PPh$_3$)IPr and 28.4 g (134.7 mmol) of 4-chloro-1-methoxy-2,6-dimethylindane. The resulting mixture was refluxed for 1.5 h, then cooled to room temperature, and 100 ml of water was added. The main part of THF was distilled off on a rotary evaporator. 500 ml of dichloromethane and 1000 ml of 1 M HCl were added to the residue. The organic layer was separated, then the aqueous layer was extracted with 2×100 ml of dichloromethane. The combined organic extract was evaporated to dryness to give a yellow oil. The product was isolated by flash-chromatography on silica gel 60 (40-63 μm; eluent: hexanes-dichloromethane=2:1, vol., then 1:1, vol.). This procedure gave 33.8 g (90%) of 4-(3,5-dimethylphenyl)-1-methoxy-2,6-dimethylindane a colorless thick oil including two diastereomers.

Anal. calc. for C$_{20}$H$_{24}$O: C, 85.67; H, 8.63. Found: C, 86.03; H, 8.80.

$^1$H NMR (CDCl$_3$), mixture of isomers: δ 7.20-6.93 (set of signals, sum 5H); 4.51 (d, J-=5.7 Hz) and 4.39 (d, J-=3.9 Hz) (sum 1H); 3.49 (s) and 3.45 (s) {sum 3H}; 3.29-3.17 (m), 2.94-2.84 (m), 2.80-2.70 (m) and 2.60-2.37 (m) (sum 3H); 2.38 (s) and 2.35 (s) (sum 9H); 1.12 (d, J=6.9 Hz) and 1.06 (d, J=7.1 Hz) {sum 3H}. $^{13}$C{$^1$H} NMR (CDCl$_3$), mixture of isomers: δ 143.50, 143.00, 140.91, 138.68, 138.58, 138.09, 137.64, 136.40, 136.03, 129.51, 129.17, 128.48, 126.35, 124.66, 91.42, 86.23, 56.82, 56.62, 40.12, 39.06, 38.00, 37.85, 21.36, 21.25, 19.17, 13.53.

7-(3,5-Dimethylphenyl)-2,5-dimethyl-1H-indene

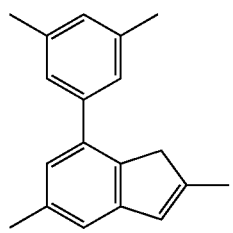

300 mg of TsOH was added to a solution of 33.8 g (120.6 mmol) of 4-(3,5-dimethylphenyl)-1-methoxy-2,6-dimethylindane in 300 ml of toluene and the resulting mixture was refluxed using Dean-Stark head for 10 min. Subsequently one more portion of 150 mg of TsOH was added, and again the formed solution was refluxed using Dean-Stark head for an additional 10 min. After cooling to room temperature the reaction mixture was washed by 200 ml of 10% $K_2CO_3$. The organic layer was separated, and the aqueous layer was additionally extracted with 2×100 ml of dichloromethane. The combined organic extract was dried over anhydrous $K_2CO_3$ and evaporated. The resulting yellow oil was dissolved in hexane. The formed solution was passed through a short pad of silica gel 60 (40-63 μm) and the elute was evaporated to dryness to give 29.1 g (97%) of 7-(3,5-dimethylphenyl)-2,5-dimethyl-1H-indene as a slightly yellowish oil.

Anal. calc. for $C_{19}H_{20}$: C, 91.88; H, 8.12. Found: C, 92.11; H, 8.34.

$^1$H NMR (CDCl$_3$): δ 7.13 (s, 2H), 7.05 (s, 1H), 6.98 (s, 1H), 6.93 (s, 1H), 6.47 (m, 1H), 3.33 (s, 2H), 2.40 (s, 3H), 2.37 (s, 6H), 2.12 (s, 3H). $^{13}$C{$^1$H} NMR (CDCl$_3$): δ 146.65, 146.45, 141.43, 137.84, 137.75, 137.21, 136.41, 128.55, 127.04, 126.23, 125.04, 119.58, 42.41, 21.40, 16.74[1].

[1]two signals in the aliphatic region were merged together

[6-test-Butyl-4-(3,5-dimethylphenyl)-5-methoxy-2-methyl-1H-inden-1-yl](chloro)-dimethylsilane

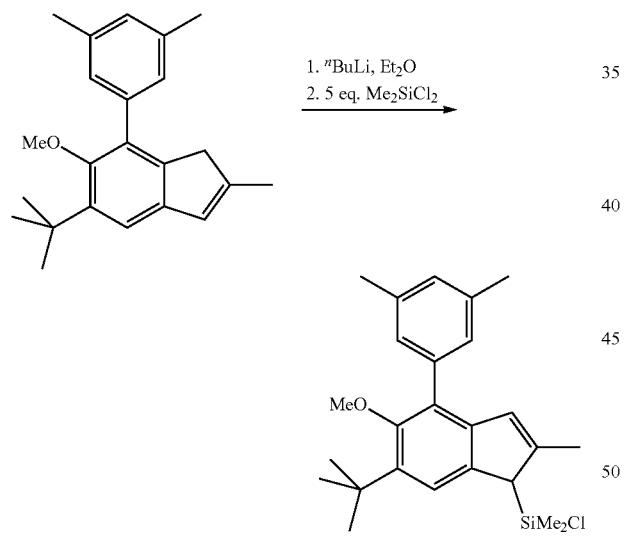

14.6 ml (35.5 mmol) of 2.43 M $^n$BuLi in hexanes was added in one portion to a solution of 11.3 g (35.3 mmol) of 5-tert-butyl-7-(3,5-dimethylphenyl)-6-methoxy-2-methyl-1H-indene in 200 ml of ether cooled to −50° C. The resulting orange solution was stirred overnight at room temperature, then the obtained orange solution containing a yellowish precipitate was cooled to −78° C. (the precipitate almost completely disappeared), and 22.8 g (177 mmol, 5 equiv) of dichlorodimethylsilane was added in one portion. The formed solution was warmed to room temperature and stirred overnight at room temperature. The resulting mixture was filtered through glass frit (G4). The precipitate was additionally washed by 2×10 ml of ether. The combined filtrate was evaporated to dryness to give the title material as slightly orange oil which was used without additional purification.

$^1$H NMR (CDCl$_3$): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). $^{13}$C{$^1$H} NMR (CDCl$_3$): δ 155.79, 145.87, 143.74, 137.99, 137.55, 137.49, 136.75, 128.32, 127.87, 127.55, 126.65, 120.86, 60.46, 49.99, 35.15, 31.17, 21.42, 17.56, 1.11, −0.58.

[2-methyl-4-(3,5-dimethylphenyl)-5-methoxy-6-tert-butyl-1H-inden-1-yl][2,6-dimethyl-4-(3,5-dimethylphenyl)-1H-inden-1-yl]dimethylsilane

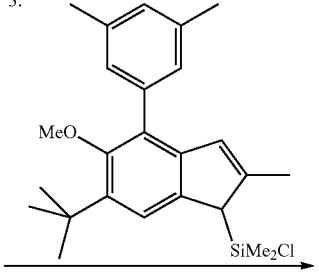

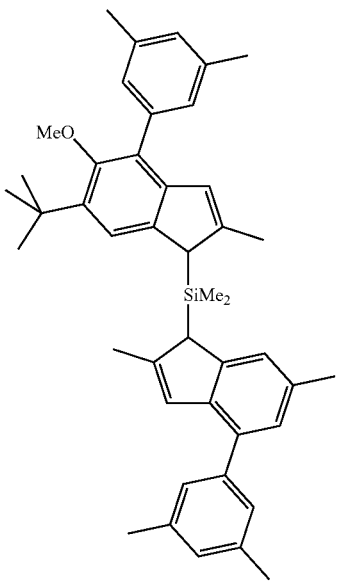

14.6 ml (35.5 mmol) of 2.43 M "BuLi in hexanes was added in one portion to a solution of 8.78 g (35.35 mmol) of 7-(3,5-dimethylphenyl)-2,5-dimethyl-1H-indene in 200 ml of ether at −50° C. This mixture was stirred overnight at room temperature, then the resulting yellowish solution containing a large amount of yellow precipitate was cooled to −50° C., then 40 ml of THF and 200 mg of CuCN were added in sequence. The resulting mixture was stirred for 0.5 h at −25° C., then a solution of [6-tert-butyl-4-(3,5-dimethylphenyl)-5-methoxy-2-methyl-1H-inden-1-yl](chloro)dimethylsilane (35.32 mmol) in 200 ml of ether was added in one portion. This mixture was stirred overnight at ambient temperature, then it was filtered through a glass frit (G4) and the obtained yellow solution was evaporated to dryness. The title product was isolated by flash-chromatography on silica gel 60 (40-63 μm; eluent: hexanes-dichloromethane=10:1, vol., then 3:1, vol.). This procedure gave 17.5 g (79%) of [2-methyl-4-(3,5-dimethylphenyl)-5-methoxy-6-tert-butyl-1H-inden-1-yl][2,6-dimethyl-4-(3,5-dimethylphenyl)-1H-inden-1-yl]dimethylsilane.

Anal. calc. for $C_4H_{52}Si$: C, 84.56; H, 8.39. Found: C, 84.85; H, 8.78.

$^1$H NMR (CDCl$_3$): δ 7.51-7.02 (set of signals, sum 7H), 6.99 (s, 2H), 6.79 (s, 1H), 6.45 (s, 1H), 3.68 and 3.66 (2m, sum 2H), 3.28 and 3.26 (2s, sum 3H), 2.44-2.32 (set of signals, 15H), 2.18 and 2.15 (2s, sum 6H), 1.43 and 1.42 (2s, sum 9H), −0.16, −0.18, −0.19 and −0.25 (4s, sum 6H). $^{13}$C{$^1$H} NMR (CDCl$_3$): δ 155.36, 147.36, 147.28, 146.50, 146.25, 146.00, 143.75, 143.70, 141.41, 140.42, 139.21, 138.24, 137.76, 137.53, 137.16, 137.09, 133.94, 132.44, 132.32, 128.34, 128.24, 127.94, 127.53, 127.15, 126.74, 126.41, 126.10, 126.05, 125.84, 125.75, 123.04, 122.84, 120.56, 120.50, 60.51, 47.37, 47.30, 47.23, 47.15, 35.16, 31.27, 31.23, 21.68, 21.59, 21.43, 17.95, 17.85, −5.27, −5.28, −5.37, −5.85 rac-anti-Me$_2$Si(2,6-Me$_2$-4(35-Me$_2$Ph)Ind)(2-Me-4-(35-Me$_2$Ph)-5-OMe-6-tBu-Ind)ZrCl$_2$

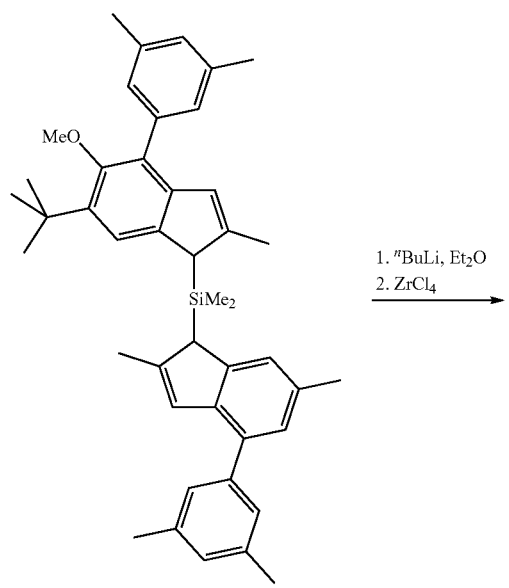

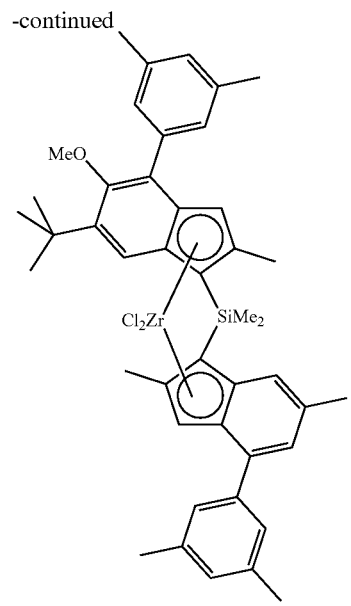

23.1 ml (56.1 mmol) of 2.43 M "BuLi in hexanes was added in one portion to a solution of 17.53 g (28.05 mmol) of [2-methyl-4-(3,5-dimethylphenyl)-5-methoxy-6-tert-butyl-1H-inden-1-yl][2,6-dimethyl-4-(3,5-dimethylphenyl)-1H-inden-1-yl]dimethylsilane in 200 ml of ether cooled to −50° C. This mixture was stirred overnight at room temperature. The resulting reddish solution containing a yellowish precipitate was cooled to −50° C., and 6.54 g (28.06 mmol) of ZrCL4 was added. The reaction mixture was stirred for 24 h at room temperature giving a light red suspension with orange precipitate. This mixture was evaporated to dryness, and the residue was treated with 200 ml of hot toluene. This mixture was filtered while hot through glass frit (G4), and the filtrate was evaporated to ca. 60 ml. The orange crystalline powder precipitated from this solution in 3 h at room temperature was collected and dried in vacuum. This procedure gave 3.60 g of pure anti-dimethylsilanediyl[2-methyl-4-(3,5-dimethylphenyl)-5-methoxy-6-tert-butyl-inden-1-yl][2,6-dimethyl-4-(3,5-dimethylphenyl)-inden-1-yl]zirconium dichloride. The mother liquor was evaporated almost to dryness, and the residue was triturated with 50 ml of ether. The insoluble orange precipitate was filtered off (G3) to give 5.01 g of a ca. 93:7 mixture of anti-/syn-complexes. Reddish crystalline powder precipitated overnight at −30° C. from the filtrate was collected and dried in vacuum. This procedure gave 1.98 g of pure syn-dimethylsilanediyl[2-methyl-4-(3,5-dimethylphenyl)-5-methoxy-6-tert-butyl-inden-1-yl][2,6-dimethyl-4-(3,5-dimethylphenyl)-inden-1-yl]zirconium dichloride. After standing for several days at room temperature, an additional portion of red crystalline powder precipitated from the mother liquor. This precipitate was filtered off to give 4.91 g of a ca. 96:4 mixture of syn-/anti-complexes. Thus, the total yield of syn- and anti-complexes isolated in this synthesis was 15.5 g (70%). Anti-dimethylsilanediyl[2-methyl-4-(3,5-dimethylphenyl)-5-methoxy-6-tert-butyl-inden-1-yl][2,6-dimethyl-4-(3,5-dimethylphenyl)-inden-1-yl]zirconium dichloride Anal. calc. for $C_{44}H_{50}Cl_2OSiZr$: C, 67.31; H, 6.42. Found: C, 67.58; H, 6.59.

$^1$H NMR (CDCl$_3$, 400 MHz, 27° C.): δ 7.49 (s, 1H), 7.36 (s, 1H), 7.28 (s, 2H), 7.22 (s, 1H), 7.32-7.12 (two very br.s, 2H), 6.98 (s, 1H), 6.95 (2s, sum 2H) 6.57 (s, 1H), 3.43 (s, 3H), 2.35 (2s, sum 9H), 2.32 (s, 6H), 2.23 (s, 3H), 2.17 (s, 3H), 1.39 (s, 9H), 1.30 (s, 3H), 1.29 (s, 3H). $^{13}C\{^1H\}$ NMR (CDCl$_3$): δ 159.81, 144.25, 139.44, 138.46, 138.02, 137.90, 136.75, 135.59, 135.44, 134.26, 133.57, 130.51, 129.36, 129.03, 128.86, 128.73, 128.22, 127.77, 127.39, 127.08, 126.41, 123.16, 122.59, 122.03, 121.72, 120.81, 81.98, 81.95, 62.61, 35.77, 30.40, 22.11, 21.45, 21.35, 18.40, 18.25, 2.68, 2.52. Syn-dimethylsilanediyl[2-methyl-4-(3,5-dimethylphenyl)-5-methoxy-6-tert-butyl-inden-1-yl][2,6-dimethyl-4-(3,5-dimethylphenyl)-inden-1-yl]zirconium dichloride Anal. calc. for $C_{44}H_{50}Cl_2OSiZr$: C, 67.31; H, 6.42. Found: C, 67.56; H, 6.60.

$^1H$ NMR (CDCl$_3$, 400 MHz, 27° C.): δ 7.50 (s, 1H), 7.35 (s, 1H), 7.25 (s, 2H), 7.31-7.08 (two very br.s, 2H), 7.01 (s, 1H), 6.96 (s, 1H), 6.95 (s, 1H) 6.84 (s, 1H), 6.48 (s, 1H), 3.26 (s, 3H), 2.42 (s, 3H), 2.36, 2.35 and 2.34 (3s, sum 15H), 2.30 (s, 3H), 1.43 (s, 3H), 1.35 (s, 9H), 1.20 (s, 3H). $^{13}C\{^1H\}$ NMR (CDCl$_3$): δ 158.95, 143.13, 139.34, 137.91, 137.78, 137.59, 136.81, 136.15, 135.78, 135.11, 134.48, 132.32, 129.25, 129.21, 128.80, 128.35, 127.33, 126.32, 124.00, 122.89, 121.45, 121.24, 121.00, 83.74, 83.67, 62.36, 35.55, 30.31, 22.72, 21.44, 18.53, 18.45, 2.92, 2.65.

Catalyst: Synthesis of Catalyst

Inside the glovebox, 72.0 mg of dry and degassed surfactant solution (1H,1H-Perfluoro(2-methyl-3-oxahexan-1-ol (CAS number 26537-88-2) (Apollo Scientific) degassed by argon bubbling prior to use) were mixed with 2 mL of 30 wt.-% Chemtura MAO in a septum bottle and left to react overnight. The following day, 39.8 mg of MC-1 (0,051 mmol, 1 equivalent) were dissolved with 4 mL of the 30 wt.-% Chemtura MAO solution in another septum bottle and left to stir inside the glovebox. After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.72 g of a red free flowing powder was obtained Al/Zr=450, Al/Surf.=250

Off-Line Prepolymerization Procedure

The catalyst MC-1 was pre-polymerized according to the following procedure: Off-line pre-polymerization experiment was done in a 125 mL pressure reactor equipped with gas-feeding lines and an overhead stirrer. Dry and degassed perfluoro-1.3-dimethylcyclohexane (15 cm$^3$) and the desired amount of the catalyst to be pre-polymerized were loaded into the reactor inside a glove box and the reactor was sealed. The reactor was then taken out from the glove box and placed inside a water cooled bath kept at 20° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerization was reached (10 min). The reaction was stopped by flashing the volatile components. Inside glove box, the reactor was opened and the content poured into a glass vessel. The perfluoro-1,3-dimethylcyclohexane was evaporated until a constant weight was obtained to yield the pre-polymerized catalyst.

TABLE 2

| | Off-line prepolymerization. | |
|---|---|---|
| Metallocene | Catalyst amount [mg] | Prepolymerization Degree [wt %/wt %] |
| MC-1 | 104 | 3.19 |

Polymerization Examples for Component B

A stirred autoclave (equipped with a ribbon stirrer) with a total volume of 21.2 dm$^3$ containing 0.2 bar-g propylene (quality 2.3; purified via columns filled with PolyMax301 T-4427B (60° C.; Cu/CuO), MS13X-APG 1/16 and Selexsorb COS) is filled with additional 4.45 kg propylene and a chosen amount of 1-hexene. The amount of triethylaluminium was 0.4 ml of TEA. After addition of triethylaluminium (0.62 molar solution in n-heptane) using a stream of 250 g propylene. The solution is stirred at 20° C. and 250 rpm for at least 20 min. Afterwards the reactor is brought up to the set pre-polymerization temperature (30° C.) and the catalyst is injected.

The solid, pre-polymerized catalyst of above is loaded into a 5 ml stainless steel vial inside the glove box. The vial is attached to the autoclave, then a second 5 ml vial containing 4 ml n-heptane and pressurized with 10 bars of N2 is added on top. The chosen amount of H2 is dosed into the reactor via flow controller. The chosen amount of hexene and H2 depends on the desired end-properties of component (B) and can be easily adjusted by an art skilled person.

The valve between the two vials is opened and the solid catalyst is contacted with heptane under N2 pressure for 2 s, and then flushed into the reactor with 250 g propylene. Stirring speed is held at 250 rpm and pre-polymerization is run for the set time. Now the polymerization temperature is increased to 75° C. The reactor temperature is held constant throughout the polymerization. The polymerization time is measured starting when the temperature is 2° C. below the set polymerization temperature. When the polymerization time 60 min has lapsed, the reaction is stopped by injecting 5 ml ethanol, cooling the reactor and flashing the volatile components. After flushing the reactor 3 times with N2 and one vacuum/N2 cycle, the product is taken out and dried overnight in a hood.

Two propylene-hexene copolymers B1 and B2 have been prepared with the following base properties:

| | MFR$_2$ [g/10 min] | C6 [wt %] | XCS [wt %] | Tm [° C.] |
|---|---|---|---|---|
| B1 | 42 | 3.1 | 0.2 | 132 |
| B2 | 37 | 6.0 | 28.1 | 122 |

Component (A) and Component an blends therefrom were compounded in a co-rotating twin-screw extruder Coperion TSE 16 at 220° C. with 0.15 wt % antioxidant (Irganox B215FF from BASF AG, Germany; this is a 1:2-mixture of Pentaerythrityl-tetrakis(3-(3',5'-di-tert. butyl-4-hydroxyphenyl)-propionate, CAS-no. 6683-19-8, and Tris (2,4-di-t-butylphenyl) phosphite, CAS-no. 31570-044); 0.05 wt % of of Ca-stearate (CAS-no.1592-23-0, commercially available from Faci, Italy).

TABLE 3

Inventive and comparative polymer blends with additivation and properties

|  |  | CE2 | CE1 | IE1 | IE2 | IE3 | IE4 | IE5 |
|---|---|---|---|---|---|---|---|---|
| Component B-1 | [wt %] | 99.8 | 0 | 10 | 25 | 45 |  |  |
| Component B-2 |  |  |  |  |  |  | 45 | 10 |
| Component A | [wt %] |  | 99.8 | 89.8 | 74.8 | 54.8 | 54.8 | 89.8 |
| Irganox B215FF | [wt %] | 0.15 | 0.15 | 0.15 | 0.15 | 0.15 | 0.15 | 0.15 |
| Ca-Stearate | [wt %] | 0.05 | 0.05 | 0.05 | 0.05 | 0.05 | 0.05 | 0.05 |
| MFR | [g/10 min] | 42 | 33 | 38 | 36 | 42 | 35 | 35 |
| Tc | [° C.] | 96 | 103 | 104 | 101 | 99 | 98 | 104 |
| Tm | [° C.] | 132 | 145 | 143 | 140 | 137 | 135 | 143 |
| Hm | [J/g] | 70 | 79 | 81 | 75 | 77 | 73 | 80 |
| XCS | [wt %] | 0.29 | 7.86 | 7.49 | 6.5 | 5.1 | 6.66 | 7.66 |
| OM | [mg/dm$^2$] | 0.46 | 10.1 | 9.7 | 7.5 | 6.3 | 7.0 | 10.5 |

OM   overall migration

The inventive and comparative polymer blends were converted to monolayer cast films with a thickness of 50 μm on a PM30 cast line (type laboratory extruder provided by Plastik Maschinenbau GmbH., Germany). The equipment consists of an extruder, chill roll with air knife and a winder. A PP 3-zone screw with a diameter of 30 mm, 25D length, 200 mm die, die gap 0.5 mm is applied in combination with a coat-hanger slit die assembly.

The extrusion parameters were as follows:

Extruder temperature profile: 220° C./240° C./250° C./260° C./260° C. (Melt temperature 250° C.; melt pressure 61 bar)

Extruder speed: 50 rpm

Chill roll temperature: 20° C.

take-off speed: 10.2 m/min

In Table 4 the optical parameters (before sterilization, b.s.) as well as the sealing performance can be seen.

TABLE 4

Sealing performance and optics before sterilization (b.s.)

|  |  | CE2 | CE1 | IE1 | IE2 | IE3 | IE4 | IE5 |
|---|---|---|---|---|---|---|---|---|
| SIT (DSC) | [° C.] | 112 | 122 | 120 | 119 | 115 | 112 | 120 |
| Haze b.s. | [%] | 60.57 | 59.18 | 54.04 | 57.77 | 65.08 | 63.55 | 56.88 |
| Clarity b.s. | [%] | 96.5 | 88.7 | 91.1 | 92.4 | 93.0 | 95.7 | 92.9 |

The films were furthermore steam sterilized.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

The optical parameters after sterilization (a.s.) can be seen in Table 5, the relative change in Haze being calculated as Delta Haze=(Haze a.s−Haze b.s.)/Haze b.s.*100%

TABLE 5

Optics after sterilization (a.s.)

|  |  | CE2 | CE1 | IE1 | IE2 | IE3 | IE4 | IE5 |
|---|---|---|---|---|---|---|---|---|
| Haze | [%] | 77.7 | 68.25 | 58.9 | 65.6 | 68.9 | 66.75 | 63.4 |
| Clarity | [%] | 96.4 | 81.2 | 87.3 | 88.3 | 92.1 | 94.0 | 92.1 |
| Delta Haze | [% rel.] | 28.3 | 15.3 | 9.0 | 13.6 | 5.9 | 5.0 | 11.5 |

From the above tables it can be clearly seen that the inventive polymer blends are characterised by an advantageous combination of sealing performance, extractables, optical properties and their change in steam sterilization.

The invention claimed is:

1. Polypropylene composition comprising a blend of:
    (A) 50.0 to 99.0 wt % of a propylene-ethylene random copolymer with an ethylene content in the range of from 0.1 to 12.0 wt %, an MFR$_2$ (230° C., 2.16 kg, ISO1133) in a range of from 0.5 to 60.0 g/10 min and a melting temperature Tm (DSC) is in the range of from 135° C. to 155° C., and
    (B) 1.0 to 50.0 wt % of a propylene-hexene random copolymer with a hexene content in the range of from 0.1 to 12.0 wt % and an MFR$_2$ (230° C., 2.16 kg, ISO1133) in a range of from 25 to 60.0 g/10 min and a melting temperature Tm (DSC) is in the range of from 120° C. to 140° C., whereby
    (i) the melting temperature of the propylene-hexene random copolymer (B) is lower than the melting temperature of the propylene-ethylene random copolymer (A) and
    (ii) the MFR$_2$ (230° C., 2.16 kg, ISO1133) of the blend is in a range of from 0.5 to 60.0 g/10 min.

2. Polypropylene composition according to claim 1, wherein the propylene-ethylene random copolymer (A) has a xylene cold soluble (XCS) amount in the range of 2.0 to 13.0 wt % (measured according to ISO 16152, first edition, 2005, at 25° C.).

3. Polypropylene composition according to claim 1, wherein the composition has a melting temperature in the range of from 128° C. to 150° C.

4. Polypropylene composition according to claim 1, wherein the composition has a crystallization temperature in the range of from 85° C. to 115° C.

5. Polypropylene composition according to claim 1, wherein the polypropylene composition has an overall migration amount of less than 20 mg/dm$^2$ (measured according to EN-ISO 116-14:2002 on injection moulded plaques 60×60×1 mm$^3$).

6. Polypropylene composition according to claim 1, wherein the composition has a xylene cold soluble (XCS) amount in the range of from 2.0 to 20.0 wt % (measured according to ISO 16152, first edition, 2005, at 25° C.).

7. Process for the preparation of the polypropylene composition according to claim 1, the process comprising the steps of:
   (i) preparing propylene-ethylene random copolymer (A) by polymerizing propylene and ethylene in the presence of a Ziegler-Natta catalyst,
   (ii) preparing propylene-hexene random copolymer (B) by polymerizing propylene and hexene in the presence of a metallocene catalyst,
   (iii) mixing said propylene-ethylene random copolymer (A) with the propylene-hexene random copolymer (B) to obtain a mixture of (A) and (B), and
   (iv) extruding said mixture to obtain the blend of (A) and (B).

8. An article comprising the polypropylene composition according to claim 1.

9. An article according to claim 8, wherein the article comprises an unoriented film comprising more than 90% of the blend according to claim 1, wherein the film is a cast film or a blown film.

10. The article according to claim 9, wherein the film has a sealing initiation temperature (calculated from DSC) in the range of from 90° C. to 125° C.

11. The article according to claim 9, wherein the film has been subjected to a sterilization treatment.

12. The article according to claim 9, wherein the film a) before sterilization treatment has a haze determined on 50 μm cast film of below 80.0% and a clarity determined on 50 μm cast film of above 90.0% and b) after sterilization treatment at 121° C. for 30 min has a haze value (determined on 50 μm cast film) of below 80.0% and a clarity (determined 50 μm cast film) of at least 85.0%.

* * * * *